(Model.)  2 Sheets—Sheet 1.
B. F. FLINT.
PERMUTATION LOCK.
No. 259,376.  Patented June 13, 1882.
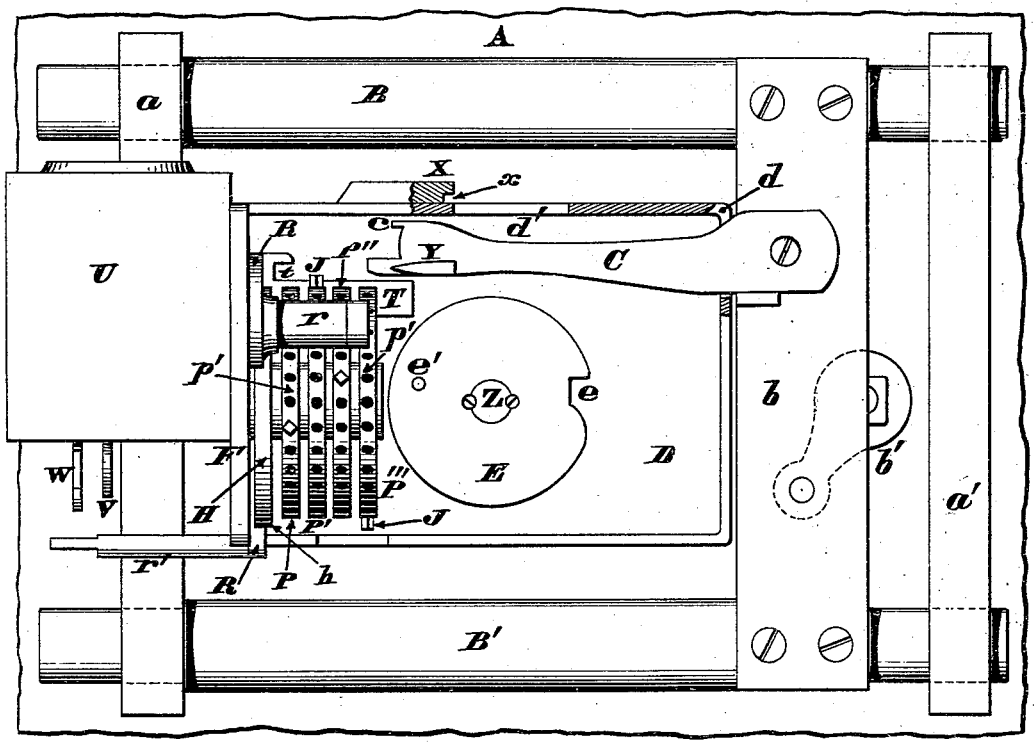
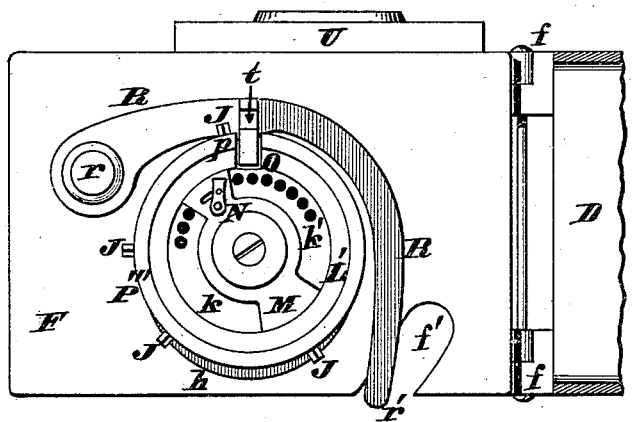
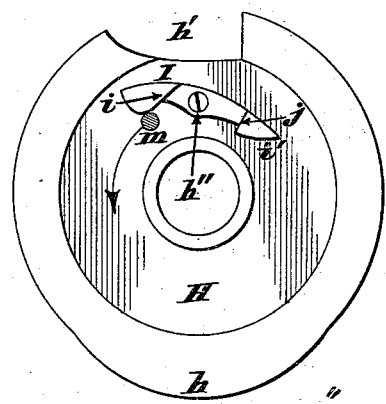
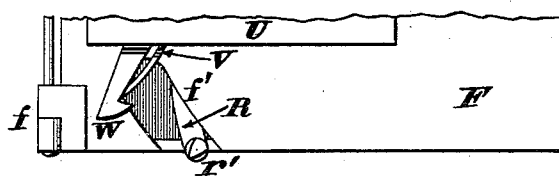
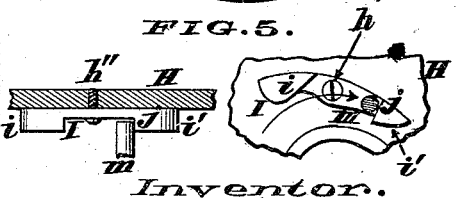
Inventor.
Benjamin F. Flint
by James H. Layman
Attorney (Model.) 2 Sheets—Sheet 2.
B. F. FLINT.
PERMUTATION LOCK.
No. 259,376. Patented June 13, 1882.
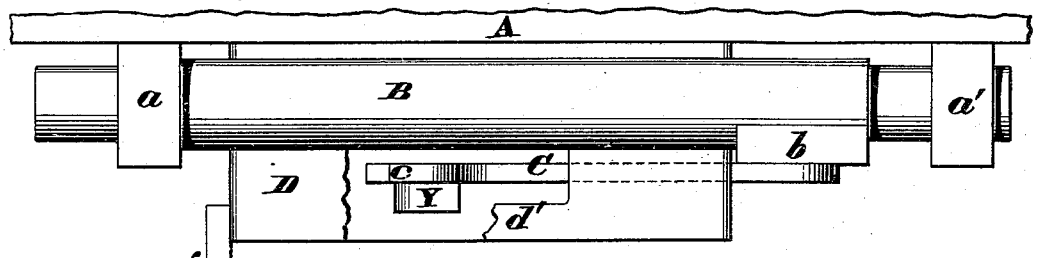
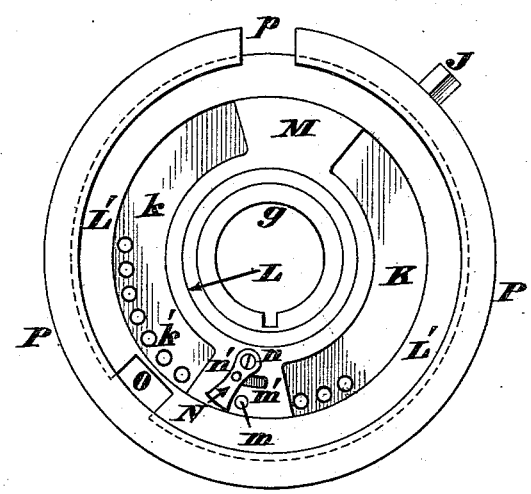
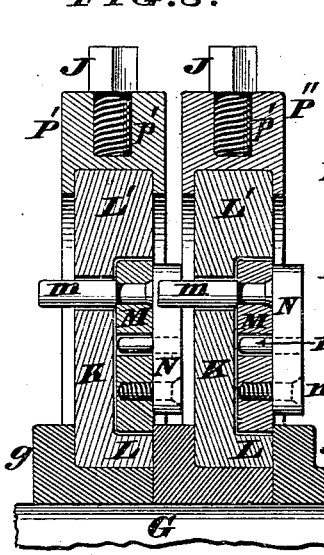
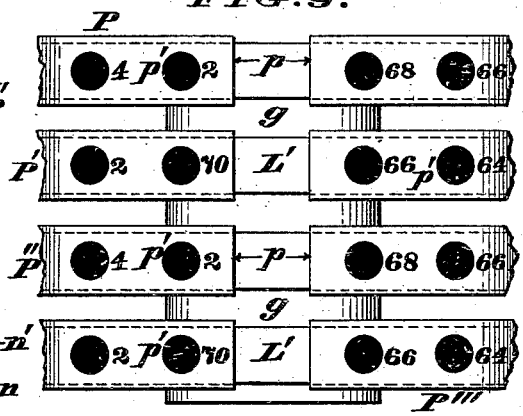
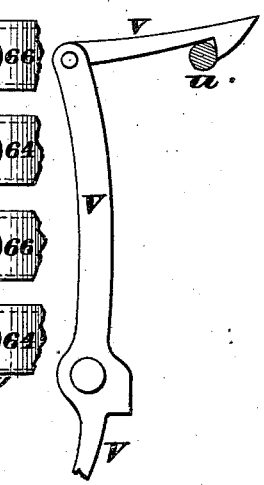
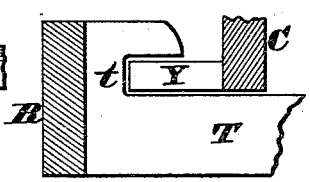
Attest.
John Buler
John W. Layman
Inventor.
Benjamin F. Flint
by James H. Layman
Attorney

UNITED STATES PATENT OFFICE.

BENJAMIN F. FLINT, OF CINCINNATI, OHIO.

PERMUTATION-LOCK.

SPECIFICATION forming part of Letters Patent No. 259,376, dated June 13, 1882.

Application filed October 18, 1881. (Model.)

*To all whom it may concern:*

Be it known that I, BENJAMIN F. FLINT, of Cincinnati, Hamilton county, Ohio, have invented certain new and useful Improvements in Permutation-Locks, of which the following is a specification.

The first part of this invention relates to those permutation-locks which are so arranged as to permit two distinct sets of combinations being operated by a single dial; and my improvement consists in applying a gated ring or annulus around the rim of an ordinary disk or wheel-tumbler, said ring being provided with a series of radial sockets for the reception of a screw-pin, wherewith any desired combination of the ring-tumblers may be made independently of the disk combinations, and by simply using a single fence and dog, as hereinafter more fully described.

The second part of my invention consists in coupling the "timer" to the combination-lock by means of a dog projecting from a fence pivoted to the cap of the lock-case, the fence being held up, so as to disengage the dog from the gates, by a stump extending outwardly from said fence and engaging with the automatic detent of the chronometer, as hereinafter more fully described.

The third part of my invention consists in providing a rotating tumbler with a pivoted fly having two inclined planes and a shoulder or other bearing, the peculiar arrangement of these devices being such as to allow the actuating-pin of the adjacent tumbler to revolve in one direction without engaging with said fly, while an opposite revolution of the pin causes the latter to come in contact with the aforesaid shoulder, and thereby drive the tumbler that carries said fly, as hereinafter more fully described.

In the annexed drawings, Figure 1 is a rear elevation of a safe-door provided with my improved lock, the dog being gated with both sets of tumblers, the hinged cap of the case being thrown wide open, and part of the top plate of said case being in section. Fig. 2 is an elevation of the inner side of said cap, which is shown in the same position as in the preceding illustration, part of the lock-case being in section. Fig. 3 is an elevation of the lower portion of the rear side of said cap in its closed position. Fig. 4 is an enlarged elevation of my cam-tumbler detached from the lock. Fig. 5 represents by horizontal section and side elevation the pivoted fly of said cam or lifting-tumbler. Fig. 6 is a plan showing the various members of the lock in the same position as seen in Fig. 1, the location of the tumblers being indicated by dotted lines, and part of the lock-case being broken away so as to expose the free end of the bolt-work tongue. Fig. 7 is an enlarged elevation of one of the disks and its surrounding ring-tumbler. Fig. 8 is an enlarged vertical section through the upper part of a pair of adjacent tumblers. Fig. 9 is an enlarged plan of the central portion of the tumblers. Fig. 10 shows the trip hooked over the minute-shaft of the time mechanism. Fig. 11 shows the lug of the tongue in lock with the dog.

The safe or vault or other door A, which may be of any suitable construction, has projecting from its rear side a pair of bearings, $a\,a'$, traversed by customary train-bolts, B B', united by a rigid tie-bar, $b$, operated by a crank, $b'$, and an ordinary external knob or handle. Pivoted to this tie-bar $b$ is a tongue, C, passing through a slot, $d$, in the end of the lock-case D, the free end of said tongue being provided with a lip, $c$, and a laterally-projecting lug, Y, for a purpose that will presently appear.

Passing through the lock-case D and door A is a spindle, Z, attached at its outer end to a knob, handle, or crank provided with a dial inscribed with suitable letters, numerals, or other characters for working the combinations set up on the tumblers. In the present case this dial is supposed to be inscribed with numerals running from 0 to 70. The inner end of this spindle carries the driving-tumbler E, having a gate, $e$, and a pin, $e'$, which latter device actuates the first one of a set of tumblers, the peculiar construction of which will be hereinafter more fully described.

Hinged to case D at $f$ is a cap or lid, F, maintained in its closed condition by screws or otherwise, said cap being provided with a horizontal stud-shaft, G, as seen in Figs. 6 and 8. This stud-shaft carries a series of non-rotating washers, $g$, upon which rotate as many tumblers as are necessary to afford the desired combinations. Of these tumblers the one, H, nearest the cap F is designated as the "lifting-tumbler," because it has a swell or eccentric, $h$, that elevates the fence R at the proper moment. Furthermore, this lifting-tumbler is gated at $h'$, and has pivoted to it at $h''$ a tilting-fly, I, provided with two inclined planes, $i\ i'$, and a shoulder, $j$, against which latter is adapted to strike the driving-pin $m$ of the adjacent disk-tumbler. (See Figs. 4 and 5.) When this pin $m$ travels in the direction of the arrow seen in Fig. 4 it first strikes the incline $i'$, and then the one $i$, thereby simply rocking the fly I on its pivot $h''$, and consequently leaving the tumbler H stationary. As soon, however, as said pin travels in the direction of the arrow seen in Fig. 5, it comes in contact with the shoulder or bearing $j$, and thus revolves the tumbler the desired distance. The other tumblers being alike, a description of one will answer for all.

By referring to Figs. 2, 7, and 8, it will be noticed that the central or primary member of each set of tumblers consists of a disk or wheel, K, having an annular depression, $k$, between its hub L and rim L', which depression has seated in it a locking device, M, adapted to rotate on said hub L. Furthermore, this depression has a circular series of holes, $k'$, to permit the passage of a pin, $m$, that projects laterally from the locking device M, the object of these appliances M $m$ being to permit a ready change of the combination of tumbler K.

Pivoted to the locking device M at $n$ is a fly, N, having a short stump, $n'$, that traverses a slot or groove, $m'$, of said member M, this fly being adapted to be struck by the pin $m$ of the adjacent tumbler, as seen in Fig. 8.

O is the tumbler-gate. The above is a description of one of a great number of expedients for operating the primary tumblers; but my invention is not limited to this or any other specific arrangement of devices for operating said tumblers.

The secondary tumblers are constructed as follows: P is an annulus or ring sprung over the rim L' of tumbler K, and adapted to rotate freely around the latter, said ring being cut into at $p$ to afford a gate of the same width as opening O. This ring is provided with a series of radial screw-threaded sockets, $p'$, to admit a suitable pin, J, having preferably a square head capable of being operated with a small wrench when it is desired to withdraw said pin and screw it into another socket, for the purpose of changing the combination of this special secondary tumbler.

In Fig. 9 the various secondary tumblers or rings, P P' P'' P''', are shown as provided with sockets numbered from 2 to 70, so as to correspond with the ordinals on the external dial that operates the spindle Z, the distance between each socket being equal to the distance from the center of gate $p$ to the center of either of its adjacent sockets. Furthermore, it will be noticed that socket 2 of ring P is directly in line with socket 70 of ring P', which arrangement of numbers is preserved throughout the entire set of secondary tumblers, because they are alternately revolved in opposite directions while being brought to a gated position; but, if desired, the sockets of rings P P''', or other corresponding pair of rings, may be provided with odd instead of even numbers, and thereby increase the complexity of the secondary combinations. Finally, these radial pins may be omitted and their functions be performed by tongues screwed to the side of ring P or dovetailed into the same, or otherwise detachably applied thereto.

Pivoted to cap F at $r$ is a fence, R, the free end of the latter having an outwardly-projecting stump, $r'$, passing through a slot, $f'$, in said cap. Extending laterally from this fence is the dog T, notched or grooved at $t$ to receive the lug Y of tongue C, as seen in Fig. 11.

Attached to cap F is a case, U, containing any approved form of chronometer, the time-relief mechanism of the same having a trip, V, adapted to engage with the minute-shaft $u$ of the clock, as seen in Fig. 10; but as this trip is fully described in Patent No. 232,604, issued September 28, 1880, further explanation of the same is unnecessary. This timer has an automatic detent, W, of the customary construction.

Applied to the top of lock-case D is a stop, X, having a groove, $x$, for a purpose that will presently appear.

$d'$ is a slot in the top of this case for permitting the free end of tongue C to be raised and engaged with the aforesaid stop.

As my improvements are capable of being used with an ordinary permutation-lock as readily as with a lock having a time attachment, I will now proceed to describe the more simple construction of the invention.

When a timer is not to be employed the slot $f'$ is omitted from the cap F, and that portion of the fence R extending from gate T down to the bottom of said slot, as indicated by the shade-lines in Fig. 2, is dispensed with.

The disk combination is set up by inserting the pin $m$ of one disk in either one of its holes $k'$, and then noting the number of said hole, so as to know how far to turn the external dial in order to operate said disk or wheel, the remaining primary tumblers being set up in the same manner, the pin of the last disk being adapted to drive the lifter H $h$. The ring combination is then set up by screwing the pins J into either of the sockets $p'$, and noting the numbers of the occupied holes. Train-bolts B B' are then thrown by hand in the usual manner, and spindle Z is turned so as to revolve the lifter H and cause its cam $h$ to raise the free end of tongue C to a level with stop X.

The bolts are then slightly retracted, so as to cause the lip $c$ of the tongue C to engage over stop X, after which act the spindle is turned, thereby scattering the tumblers and destroying the combinations for the time being. It is apparent any clandestine attempt to force the bolts back will be effectually resisted by the immovable stop X, and therefore there will be no danger of the tumblers or other comparatively weak members of the lock being broken or injured by the force thus exerted against said bolts or their accessories.

To open the lock the dial is manipulated so as to restore the ring combination first, the elevated position of tongue C serving to maintain the dog T a slight distance above the various rings P, and thus allowing the latter to be readily rotated in either direction. The ring combination being restored, the handle of the bolt-work is turned so as to slightly advance the bolts B B', and slip the lip $c$ off the stop X, which act leaves the tongue C free to drop a slight distance on account of the dog T dropping into the ring-gates $p$. As soon as the dog is thus "gated," the external handle is again operated, but this time for the purpose of retracting bolts B B' far enough to insert the lip $c$ in groove $x$, and holding it there until the disk combination is recovered. This combination is obtained in the usual manner by properly operating the dial, and as soon as all the disk-gates are in line the handle is again turned so as to advance the bolts B B' and cause the lip $c$ to slip out of groove $x$. Dog T now descends still further, dropping into the gates O of the disks and pulling down the tongue on account of its stump Y being engaged with the groove $t$ of said dog. Tongue C being now free from any obstruction, the bolts B B' are at liberty to be fully retracted, and the door is then opened in the usual manner. While the disk-tumblers are being collected together it is evident the gathered rings cannot be shifted out of their proper places, because the dog T is gated in said disks.

From this description it is apparent that a single spindle is used for operating the primary and secondary combinations of the lock, and one dog suffices for both sets of tumblers, thereby simplifying the construction of the mechanism and rendering it less liable to get out of order.

To use my improvements with a chronometer attachment, the shaded portion of fence R (seen in Fig. 2) must be employed, so as to allow the stump $r'$ of said fence to operate in conjunction with the devices V W, it being understood that the combination of the ring-tumblers is kept secret, either with the maker of the safe or else with the president of the bank, or some person other than the cashier, or whoever generally opens the safe. Now, as long as the timer runs regularly the detent W will be automatically disengaged from the stump $r'$ of fence R at the proper moment, thereby allowing the dog T to be dropped and the lock opened in the usual manner; but in case the clock should stop from any cause whatever before the appointed time for opening the safe the ring combination must be obtained, and then the tumblers P must be set accordingly. The first step in this proceeding consists in operating the spindle Z, so as to turn the lifting-tumbler H $h$ and cause the fence R to disengage its dog T from all the gates O and $p$, which act brings the stump $r'$ of said fence in contact with the lower end of trip V, thereby compelling the hook of the latter to catch on the minute-shaft $u$ of the clock, as seen in Fig. 10. Consequently the timer is disconnected from the tumblers as long as the hook remains in this position, and the ring combination is now free to be unlocked, as previously described; but when the clock is running regularly this hook is automatically disengaged from shaft $u$ at stated intervals—say every five seconds—thereby rendering it impossible for a person to open the safe before the appointed time, as fully described in Patent No. 232,604, previously alluded to.

I claim as my invention—

1. A gated secondary tumbler rotating around a primary tumbler, and provided with a series of sockets and a movable pin, or their equivalents, whereby a combination of said secondary tumblers may be effected without shifting the primary tumblers, for the purpose described.

2. The combination, in a permutation-lock, of a gated secondary tumbler revolving around a gated primary tumbler, said primary and secondary tumblers being provided with independent combination-changing devices, as and for the purpose described.

3. A series of gated secondary tumblers arranged to rotate around a series of gated primary tumblers, said primary and secondary tumblers being provided with independent combination-changing devices and adapted to engage with a single dog, for the purpose specified.

4. In combination with a rotating lock-tumbler, the pivoted fly I $h''$, having two inclined planes, $i\ i'$, and a shoulder, $j$, in order that the driving-pin $m$, when moved in one direction, will actuate said tumbler, but will be inoperative when moved in the opposite direction, as herein described.

5. The combination, in a lock, of a series of gated secondary tumblers rotating around a series of gated primary tumblers, suitable devices for changing the combinations of one set of tumblers independently of the other set, a single dog for engaging with said tumblers, and a spindle to operate them, as described.

6. The combination of tongue C, lug Y, pivoted fence R $r$, and grooved dog T $t$, as specified.

7. The combination of disk-tumbler K, ring-tumbler P $p$, female threaded sockets $p'$, and screw-pin J, as and for the purpose specified.

In testimony whereof I affix my signature in presence of two witnesses.

BENJAMIN F. FLINT.

Witnesses:
JAMES H. LAYMAN,
SAML. S. CARPENTER.